(12) United States Patent
Wilhelm

(10) Patent No.: US 9,422,028 B2
(45) Date of Patent: Aug. 23, 2016

(54) SURF WAKE DEVICE FOR A WATERCRAFT

(71) Applicant: Joshua Wilhelm, Pittsburgh, IA (US)

(72) Inventor: Joshua Wilhelm, Pittsburgh, IA (US)

(*) Notice: Subject to any disclaimer, the term of this patent is extended or adjusted under 35 U.S.C. 154(b) by 0 days.

(21) Appl. No.: 14/840,558

(22) Filed: Aug. 31, 2015

(65) Prior Publication Data

US 2016/0059934 A1    Mar. 3, 2016

Related U.S. Application Data

(60) Provisional application No. 62/043,713, filed on Aug. 29, 2014, provisional application No. 62/056,846, filed on Sep. 29, 2014, provisional application No. 62/187,446, filed on Jul. 1, 2015.

(51) Int. Cl.
| | | |
|---|---|---|
| *B63B 1/22* | (2006.01) |
| *B63B 1/24* | (2006.01) |
| *B63B 1/32* | (2006.01) |
| *B63B 1/18* | (2006.01) |
| *B63B 35/85* | (2006.01) |

(52) U.S. Cl.
CPC ... *B63B 1/32* (2013.01); *B63B 1/18* (2013.01); *B63B 35/85* (2013.01); *B63B 2035/855* (2013.01); *Y02T 70/12* (2013.01)

(58) Field of Classification Search
CPC ............ B63B 1/18; B63B 1/22; B63B 1/242; B63B 1/28; B63B 1/286; B63B 1/32; B63B 39/061
USPC .................................................. 114/284, 285
See application file for complete search history.

(56) References Cited

U.S. PATENT DOCUMENTS

| | | | |
|---|---|---|---|
| 3,769,927 A | 11/1973 | Carney et al. | |
| 3,918,666 A | 11/1975 | Florian | |
| 4,043,531 A | 8/1977 | Green | |
| 5,184,858 A * | 2/1993 | Arai ..................... | B65G 49/061 116/70 |
| 5,549,071 A | 8/1996 | Pigeon et al. | |
| 5,860,384 A | 1/1999 | Castillo | |
| 6,012,408 A | 1/2000 | Castillo | |
| 6,154,929 A | 12/2000 | Dwyer | |
| 6,167,830 B1 | 1/2001 | Pilger | |
| 6,874,441 B2 | 4/2005 | Pigeon | |
| 6,941,884 B2 | 9/2005 | Moore | |
| 7,063,031 B2 | 6/2006 | Earl et al. | |
| 7,140,318 B1 | 11/2006 | Gasper | |
| 7,182,037 B2 | 2/2007 | Otobe et al. | |
| 7,189,127 B2 | 3/2007 | Otobe et al. | |
| 7,252,047 B1 | 8/2007 | Baucomb, Jr. | |
| 7,434,531 B1 | 10/2008 | Zsido et al. | |

(Continued)

FOREIGN PATENT DOCUMENTS

WO    2013071148    5/2013

*Primary Examiner* — Anthony Wiest
(74) *Attorney, Agent, or Firm* — Cohen & Grigsby, P.C.

(57) ABSTRACT

A device to redirect a wake of a watercraft, and a method of use are disclosed. The device includes a main body panel which extends into a flow of water as the watercraft travels through the water, and at least one suction cup which provides connection between the main body panel and a hull of the watercraft. The device changes the shape of the wake by diverting the flow of water in a different direction, and may be used to produce a wake suitable for wake surfing. The device may include at least one vacuum pump in fluid communication with the at least one suction cup, and at least one release actuator for selectively releasing a vacuum generated between the at least one suction cup and the hull of the watercraft by the vacuum pump.

20 Claims, 17 Drawing Sheets

(56) References Cited

U.S. PATENT DOCUMENTS

| | | |
|---|---|---|
| 7,475,652 B2 | 1/2009 | Dvorak |
| 7,707,956 B2 | 5/2010 | Moore |
| 8,539,897 B1 | 9/2013 | Gasper et al. |
| 8,578,873 B2 | 11/2013 | Gasper et al. |
| 8,833,286 B1 | 9/2014 | Sheedy et al. |
| 9,296,447 B1* | 3/2016 | Morgan .................... B63B 1/28 |
| 2007/0216154 A1* | 9/2007 | Casagrande ........... A01K 97/06 283/61 |
| 2013/0213293 A1 | 8/2013 | Gasper et al. |
| 2013/0228113 A1 | 9/2013 | Gasper et al. |
| 2013/0228115 A1* | 9/2013 | Gasper ................... B63B 1/286 114/284 |
| 2014/0137786 A1 | 5/2014 | Gasper et al. |
| 2014/0137787 A1 | 5/2014 | Gasper et al. |
| 2014/0261135 A1 | 9/2014 | Gasper et al. |

* cited by examiner

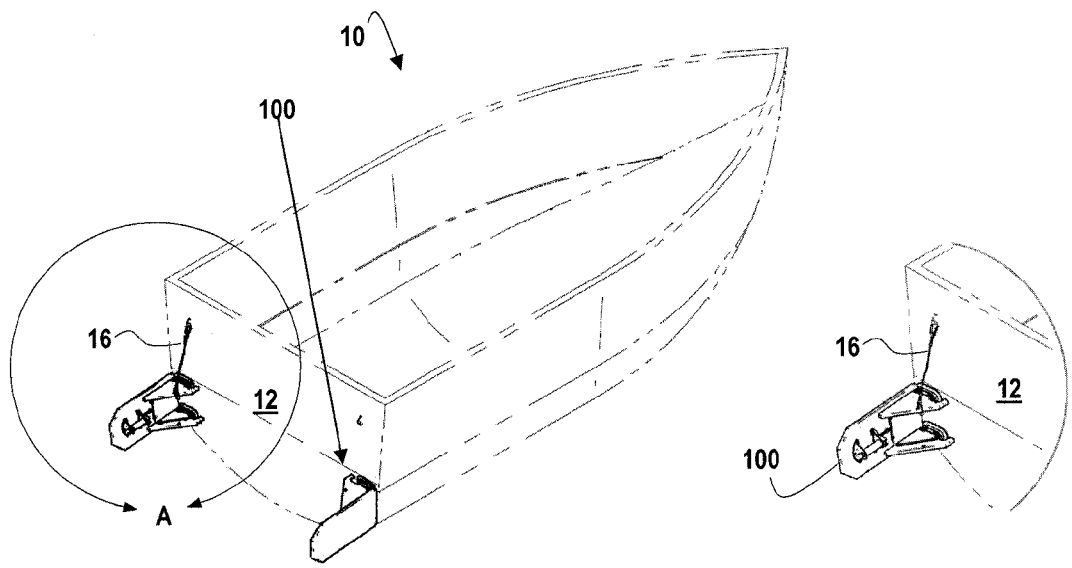
FIG. 1A  FIG. 1B
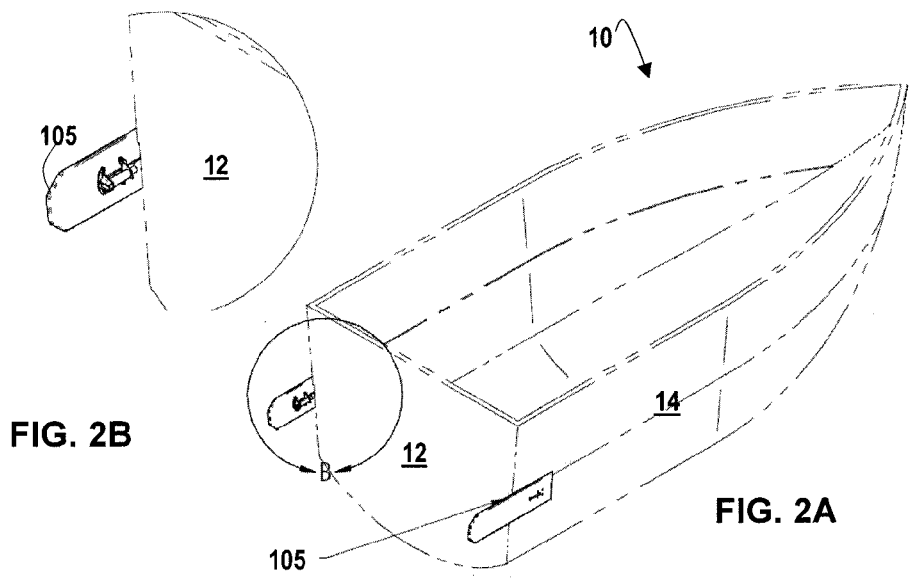
FIG. 2B  FIG. 2A

SURF WAKE DEVICE FOR A WATERCRAFT

The present application claims the benefit under 35 U.S.C. §119(e) of prior U.S. Provisional Application No. 62/043,713 filed Aug. 29, 2014, U.S. Provisional Application No. 62/056,846 filed Sep. 29, 2014, and U.S. Provisional Application No. 62/187,446 filed Jul. 1, 2015 by Joshua Wilhelm, each having the title "Surf Wake Device for a Watercraft", the disclosure of each being incorporated herein by reference in its entirety.

FIELD OF THE INVENTION

This invention pertains generally to a device for modifying a wake produced by a watercraft traveling through water. More specifically, the invention pertains to a device which is removeably attachable to a hull or stern of a watercraft and which may be used to produce a wake suitable for surfing on a wake board.

BACKGROUND OF THE INVENTION

Wake surfing is a water sport in which a rider is towed behind a watercraft on a specialized surf board, and surfs on the wave or wake which is formed behind the watercraft. As a watercraft travels through water it displaces the water and generates waves including a bow wave and diverging stern waves on both sides of the watercraft. Due to pressure differences, these waves generally converge in the hollow formed behind the traveling watercraft and/or interfere with each other to form a wake behind the watercraft. Such a wake, however, is generally small, choppy or too close to the watercraft to be suitable and/or safe for water sports, and particularly not suitable for wake surfing.

In the past, ballast, such as lead weights, concrete, or other heavy objects have been placed in different sections of the watercraft to weight the craft down and create a larger wake. In general, the best weight configuration for wake surfing was to place the majority of the weight near the back corner of the watercraft at the side on which the rider will surf. Greater ballast weight forced the watercraft deeper in the water and created a bigger wake. Further, forcing one side of the watercraft deeper in the water enhanced one stern wave while reducing the opposite stern wave, leading to a larger wake with a higher and more sustainable peak. The amount of ballast weight required to form a wake sufficient for wake surfing could be hundreds, and even thousands, of pounds. This weight was not only difficult to maneuver, but also occupied a significant amount of prime space on the watercraft.

More recent attempts to facilitate wake surfing have included the use of trim tabs. Trim tabs, originally designed to adjust the trim of a watercraft, have been used to purposefully modify the wake of a watercraft. Trim tabs may be used to increase the displacement of one side of the watercraft into the water, thus increasing the size of the wake on the side of the watercraft with the increased displacement. While trim tabs have been useful for producing a wake, typically the wake does not provide enough surfable area for the rider.

Current solutions include watercraft having retractable devices integrated on the transom, or port or starboard sides near the stern of the watercraft, which may be pivoted from a retracted position which lies flush with a side of the watercraft to a deployed position which places the device out into the passing water. In the deployed position, the device redirects the water to increase the surfable area of the wake formed by the watercraft, and produces a wake with a higher and more sustainable peak. Such solutions, however, require the purchase of a new watercraft specifically designed for wake surfing.

SUMMARY OF THE INVENTION

The presently disclosed invention overcomes many of the shortcomings of the prior art by providing a device which is removeably attachable to the hull or stern of a watercraft. The device may be designed to change the shape of the wake of the watercraft to produce a suitable surfing wake without adding significant extra weight at a rear corner of the watercraft. The device may be designed to pull the stern of the watercraft deeper into the water. As such, ballast weight need not be added or moved from one side of the watercraft to another, thus no significant shifting of the watercraft occurs, and overall handling of the watercraft is unchanged. Furthermore, the device may be mounted to the watercraft with one or more industrial strength suction cups that may optionally include one or more associated pumps to increase suction, and a release valve to remove the suction. This allows a user to quickly install the device on the watercraft, with no modifications to the watercraft, while the release valve allows the user to quickly release the device from the watercraft.

Thus, the presently disclosed invention includes a surf wake device to redirect a wake of a watercraft, the device comprising: a main body portion and at least one suction cup connected to the main body portion and configured to provide removable attachment of the device to a hull or a transom of the watercraft. Removable attachment of the device to a port side of the watercraft along the hull or the transom changes a shape of the wake on a starboard side of the watercraft, and removable attachment of the device to the starboard side of the watercraft along the hull or the transom changes the shape of the wake on the port side of the watercraft.

The surf wake device should be removeably attached to only one side (either port or starboard) of the watercraft along the hull or along the transom adjacent either one side such that the device is positioned outboard extending beyond the transom of the watercraft and into a flow of water as the watercraft travels through water.

The surf wake device may further comprise a handle attached to a back side of the main body portion, wherein the back side of the main body portion faces away from the flow of water when the device is attached of the watercraft.

The surf wake device may further comprise at least one vacuum pump in fluid communication with the at least one suction cup, wherein the at least one vacuum pump is configured to provide a vacuum between the at least one suction cup and the hull of the watercraft when the device is attached of the watercraft.

In certain embodiments, the at least one vacuum pump may be integral with the handle.

The surf wake device may further comprise at least one pump line operably connected to the at least one vacuum pump and the at least one suction cup, wherein the at least one pump line provides fluid communication between the at least one vacuum pump and the at least one suction cup.

The surf wake device may further comprise at least one release actuator for selectively releasing the vacuum between the at least one suction cup and the hull of the watercraft.

In certain embodiments, the at least one vacuum pump may be a manual pump, such as a hand pump. In certain embodiments, the pump may be an automatic pump such as a battery operated pump, a pneumatic pump, a motorized electric pump, or any pump known in the art designed and configured to provide a vacuum.

The surf wake device may further comprise a safety cable providing removable connection between the device and the hull of the watercraft.

In certain embodiments, the main body portion may comprise a water resistant plastic material such as, for example, PVC, or HDPE. Well known HDPE products include at least MARINEBOARD, SEABOARD, STARBOARD, or DENSETEC material.

In certain embodiments, the device may be designed to float.

In certain embodiments, the at least one suction cup may be positioned substantially perpendicular to the main body portion. In such embodiments, the surf wake device may further comprise at least one side panel attached to the main body portion and positioned substantially perpendicular to the main body portion, wherein the at least one suction cup may be attached to the at least one side panel. The surf wake device may also comprise at least one adjustable rail that provides movement of the at least one side panel to at least one different position on the main body portion. In certain embodiments, the at least one different position may be parallel or perpendicular to the longitudinal axis of the main body portion. The surf wake device may also comprise at least one positioning bracket for angling the main body portion relative to the at least one suction cup.

In certain embodiments, the at least one suction cup may have a radial axis that is substantially parallel to a longitudinal axis of the main body portion, wherein the device may be removeably attachable to the hull of the watercraft on a port or a starboard side. In such embodiments, the suction cup may be position on the same side as a handle, i.e. on a back side of the main body portion.

BRIEF DESCRIPTION OF THE DRAWINGS

Aspects, features, benefits and advantages of the embodiments herein will be apparent with regard to the following description, appended claims, and accompanying drawings. In the following figures, like numerals represent like features in the various views. It is to be noted that features and components in these drawings, illustrating the views of embodiments of the presently disclosed invention, unless stated to be otherwise, are not necessarily drawn to scale.

FIG. 1A is a view of a surf wake device according to an embodiment of the presently disclosed invention attached to a transom of a watercraft;

FIG. 1B is a close-up view of detail A from FIG. 1A showing attachment of the surf wake device to the watercraft;

FIG. 2A is a view of a surf wake device according to an embodiment of the presently disclosed invention attached to a hull of the watercraft;

FIG. 2B is a close-up view of detail B from FIG. 2A showing attachment of the surf wake device to the watercraft;

DETAILED DESCRIPTION

Figure 3:
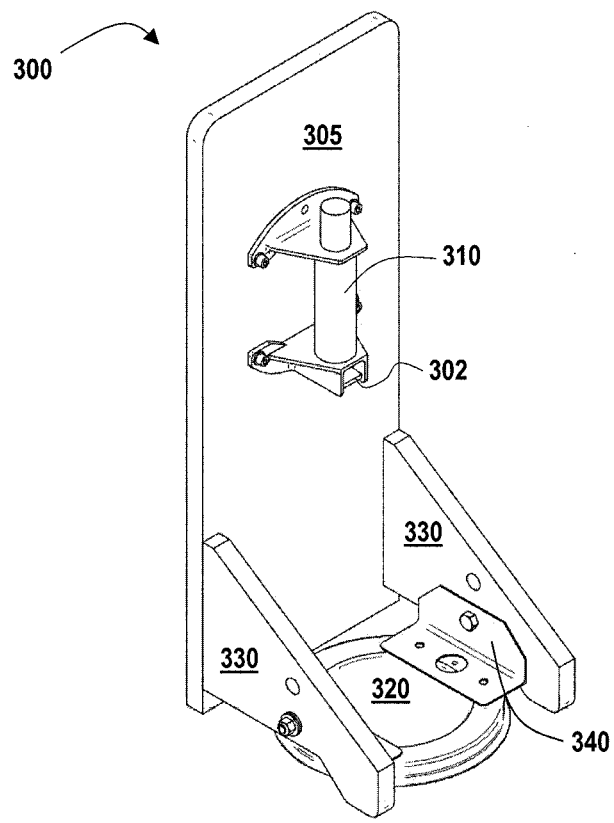
FIG. 3 is a perspective view of a surf wake device according to an embodiment of the presently disclosed invention.

In the following description, the present invention is set forth in the context of various alternative embodiments and implementations involving a surf wake device. While the following description discloses numerous exemplary embodiments, the scope of the present patent application is not limited to the disclosed embodiments, but also encompasses combinations of the disclosed embodiments, as well as modifications to the disclosed embodiments.

Various aspects of the surf wake device may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Various aspects of the surf wake device may be illustrated with reference to one or more exemplary implementations. As used herein, the term "exemplary" means "serving as an example, instance, or illustration," and should not necessarily be construed as preferred or advantageous over other variations of the devices, systems, or methods disclosed herein. "Optional" or "optionally" means that the subsequently described event or circumstance may or may not occur, and that the description includes instances where the event occurs and instances where it does not. In addition, the word "comprising" as used herein means "including, but not limited to".

Relative terms such as "lower" or "bottom" and "upper" or "top" may be used herein to describe one element's relationship to another element illustrated in the drawings. It will be understood that relative terms are intended to encompass different orientations of aspects of the surf wake device in addition to the orientation depicted in the drawings. By way of example, if aspects of the surf wake device in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

As used herein, the term "substantially perpendicular" shall be taken to indicate an angle that is within 20° of perpendicular, such as 90°±20°, or that is within 10° of perpendicular, such as 90°±10°, or that is within 5° of perpendicular, such as 90°±5°. As used herein, the term "substantially parallel" shall be taken to indicate an angle that is within 20° of parallel, such as 90°±20°, or that is within 10° of parallel, such as 90°±10°, or that is within 5° of parallel, such as 90°±5°.

It must also be noted that as used herein and in the appended claims, the singular forms "a", "an", and "the" include the plural reference unless the context clearly dictates otherwise. Unless defined otherwise, all technical and scientific terms used herein have the same meanings as commonly understood by one of ordinary skill in the art.

The presently disclosed invention includes a surf wake device which may redirect a wake of a watercraft. In all embodiments, the device comprises a main body portion and at least one suction cup connected to the main body portion and configured to provide removable attachment of the device to a hull or a transom of the watercraft. Removable attachment of the device to the hull on a port side of the watercraft, or on the transom adjacent the port side of the watercraft, changes a shape of the wake on a starboard side of the watercraft. Likewise, removable attachment of the device to the hull on a starboard side of the watercraft, or on the transom adjacent the starboard side of the watercraft, changes a shape of the wake on a port side of the watercraft.

The presently disclosed invention further envisions a device comprising a main body portion and at least one suction cup connected to the main body portion and configured provide removable attachment of the device to stern of the boat. Removable attachment of the device to the hull of the watercraft near the stern may pull the stern of the watercraft deeper into the water as the watercraft travels through the water.

As will be discussed in more detail below, each of the various embodiments disclosed herein may comprise additional components, such as one or more vacuum pump(s) and pump lines, one or more side panels, one or more adjustment brackets, and a handle. Each of the embodiments disclosed herein may further comprise a safety cable which may provide removable connection between the device and the hull of the watercraft. As such, should the suction cup become detached from the hull of the boat, such as upon removal of the device from the boat, the device will not float away. Furthermore, for each of the embodiments disclosed herein, the main body portion may comprise a water resistant plastic material, such as, for example, PVC or HDPE, so it will not be affected by water. In addition, the devices of each embodiment may be designed to float.

In certain embodiments, the suction cup may be an industrial strength suction cup and may be constructed of rubber, or of rubber and hard plastic. Stainless steel or any other strong water resistant material may be used for the mounting brackets, rails, and other components used to secure portions of the surf wake device.

Referring now to the drawings, various embodiments of the surf wake device of the presently disclosed invention are shown in FIGS. 1 through 27. Embodiments shown in FIGS. 1-23 may be removeably attachable to a stern of the watercraft, such as along a transom adjacent a port side or a starboard side. Embodiment shown in FIGS. 24-27 may be removeably attachable to the hull of the watercraft along the port side or starboard side. In all embodiments, the device is designed to extend past the hull of the watercraft into the passing water.

The various embodiments shown in each of FIGS. 1A, 1B, 2A, and 2B are not necessarily drawn to scale. For example, in certain embodiments, the main body portion may have a width of from about 6 inches wide to about 28 inches wide, and may have a length of about 12 inches long to about 36 inches long. The dimensions of the main body portion may be designed to meet the criteria of specific watercraft sizes and types. Further, the various configurations shown in each of the embodiments disclosed herein below may accommodate different watercraft sizes, configurations, and types.

As indicated, a surf wake device according to the presently disclosed invention may be mounted to a watercraft 10 along the stern (100, as shown in FIG. 1A mounted to the transom 12) or along the hull on the port side or starboard side (105, as shown in FIG. 2A mounted to the hull 14). As shown in FIGS. 1A and 2A, two surf wake devices are mounted to the stern or hull of the watercraft 10 to demonstrate the reversibility of mounting the devices. In practice, however, only one device would be mounted to either the port or starboard side of the watercraft 10 along the hull (FIG. 2A), or would be mounted to the transom of the watercraft adjacent the port side or the starboard side (FIG. 1A), to create a surfable wake as the watercraft moves through the water. Also shown in FIGS. 1A and 1B is a safety cable 16 which provides removeable connection between the surf wake device 100 and the watercraft 10.

FIG. 1B is a magnified view of detail A from FIG. 1A, which shows the surf wake device 100 attached to the transom 12 of the watercraft along the port side. FIG. 2B is a magnified view of detail B from FIG. 2A, which shows the surf wake device 105 attached to the hull 14 of the watercraft along the port side. As shown, the surf wake device may extend past the end of the watercraft and into the moving water to change the shape of the wake.

Typically, the watercraft 10 is driven by a single inboard motor (not shown). However, the surf wake device can be utilized with other types of watercrafts and propulsion systems, including but not limited to left-handed or right-handed propellers, outboard motors, sterndrives, and the like.

When the surf wake device (100 or 105) of the presently disclosed invention is attached to a port side, a starboard wake will be formed. That is, the surf wake device may be attached to or adjacent a port side so that the device (100 or 105)

extends into the passing water and redirects the waves on the port side, which facilitates constructive interference of converging waves to form a larger starboard wake with a higher peak and smoother face that is suitable for starboard surfing. Alternatively, the surf wake device (100 or 105) of the presently disclosed invention may be attached to or adjacent a starboard side to assist in forming a port wake.

With reference to FIG. 3, the surf wake device 300 may comprise a main body portion 305 and one or more industrial strength suction cups 320 which may provide removable attachment of the device 300 to a watercraft. The surf wake device 300 may further comprise one or more side wall portions 330, which may provide secure attachment of the suction cup 320 to the main body portion 305. Such attachment may include brackets and bolts (collectively 340), or any other means for attachment known in the art. The surf wake device 300 may further comprise an attachment handle 310.

In certain embodiments, the attachment handle 310 may include a pump that may be used in conjunction with pump lines to provide a vacuum to the suction cup 320 which may increase the suction force of the suction cup 320 when installed on the hull of the watercraft.

Figure 4:
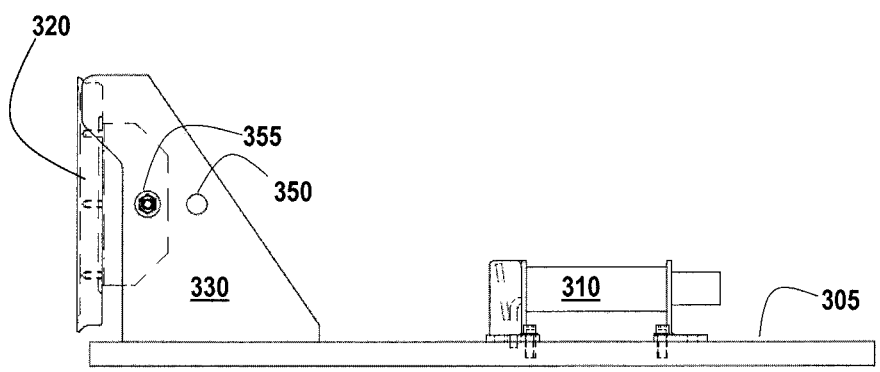
FIG. 4 is a side view of the surf wake device of FIG. 3, pointing out the side support panels and attachment handle.

FIG. 4 shows a side view of the surf wake device 300 including the main body portion 305, the attachment handle 310, one side wall 330, and the suction cup 320. Also shown are bolt holes (350, 355) used to attach the suction cup 320 to the side wall portions 330. As shown, more than one bolt hole (350, 355) may be included so that the absolute position of the suction cup 320 relative to the side walls 330 may be adjusted.

In certain embodiments, the surf wake device may comprise more than one suction cup, and at least one associated pump to increase suction to the suction cups, and a release valve to remove the suction. This allows a user to quickly install the device on the watercraft, with no modifications to the watercraft, while the release valve allows the user to quickly release the device from the watercraft, such as by depressing release actuator 302 (see FIGS. 3 and 4).

Figure 5:
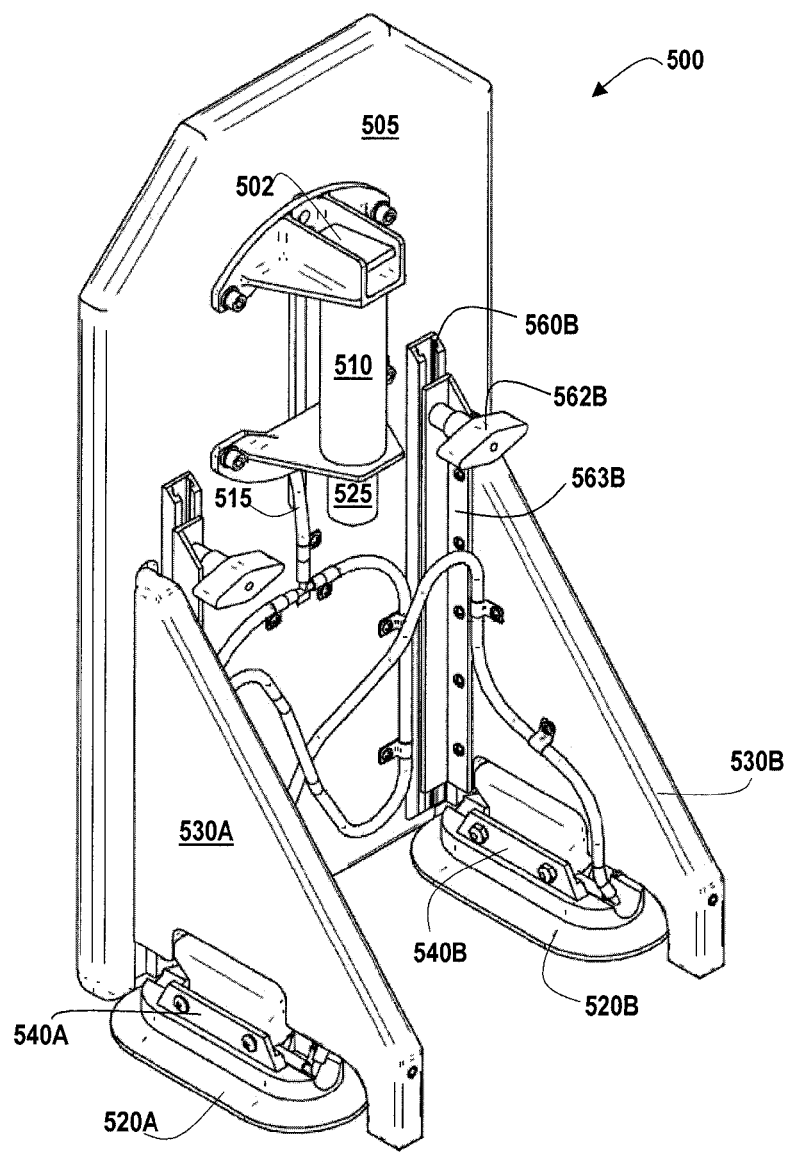
FIG. 5 is a perspective view of a surf wake device according to an embodiment of the presently disclosed invention.
Figure 6:
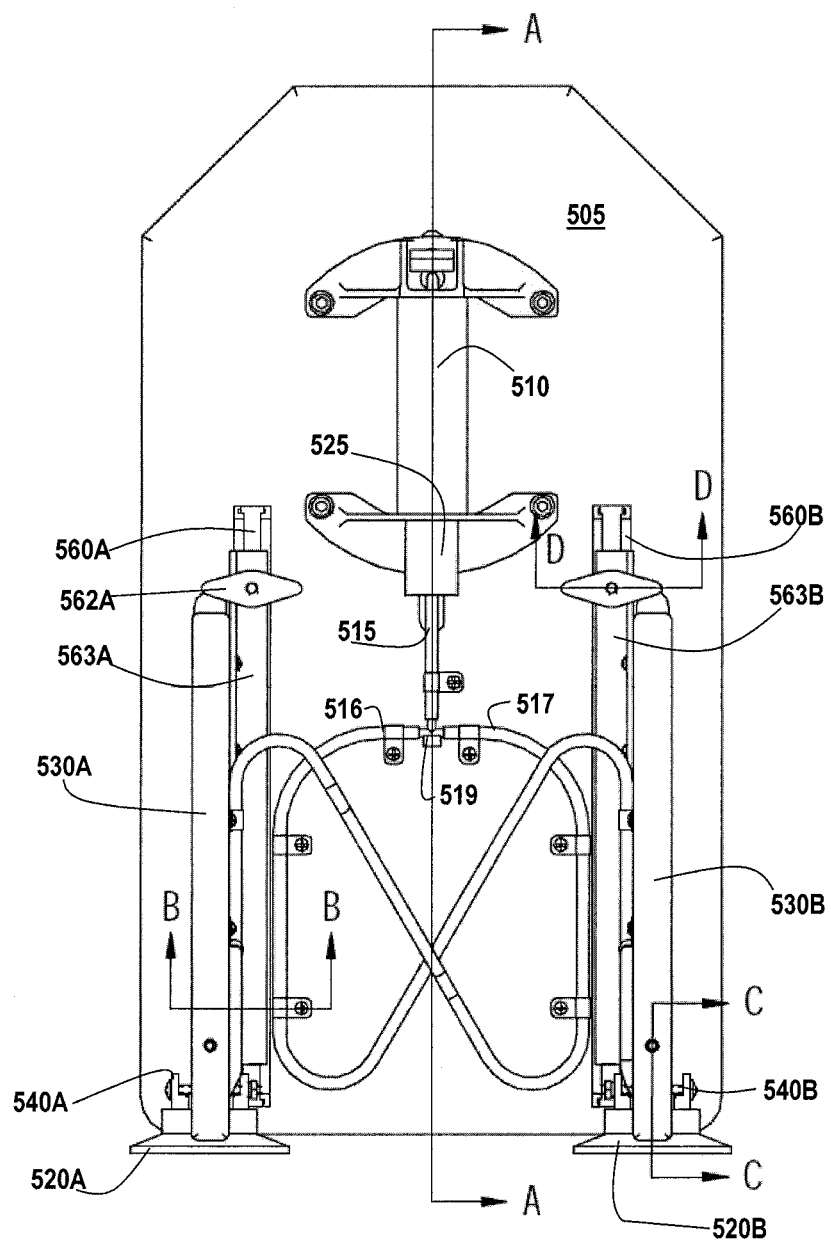
FIG. 6 is a front view of the surf wake device of FIG. 5, pointing out the suction cups, pump and pump lines.

With reference to FIGS. 5 and 6, a surf wake device 500 according to the presently disclosed invention may comprise a main body portion 505, an attachment handle comprising a pump (collectively 510), two side wall portions (530A, 530B), and two suction cups (520A, 520B). The two suction cups (520A, 520B) may be attached to respective side wall portions (530A, 530B) via an attachment bracket and associated nuts and bolts (collectively 540A or 540B). Further, the two side wall portions (530A, 530B) may be attached to the main body portion 505 by respective mounting bracket (563A, 563B) and attachment rails (560A, 560B). Respective locking nuts (562A, 562B) may be used to secure the two side wall portions (530A, 530B) at a specific position on the attachment rails (560A, 560B). As such, the absolute position of the suction cups (520A, 520B) relative to the main body portion 505 may be adjusted.

Also shown in FIGS. 5 and 6 are the pump lines (515, 516, 517) that provide fluid communication between the pump (510) and the two suction cups (520A, 520B). A pump button 525 may be used (e.g., depressed and released repeatedly) to manually provide a vacuum to the suction cups (520A, 520B). With specific reference to FIG. 6, pump button 525 may be depressed and released to manually produce a vacuum in a chamber of the pump (not shown). This vacuum may be communicated from the pump chamber through pump line 515, and diverted using a T-valve 519 to the pump lines leading to each suction cup; pump line 516 leading to suction cup 520B and pump line 517 leading to suction cup 520A. Reference numbers shown in FIG. 5 are reproduced in FIG. 6 for ease of understanding. The vacuum may be released by depressing a release actuator 502 (see FIGS. 5 and 7).

As shown in the various embodiments of the presently disclosed invention, the device may comprise a pump. While the pump is illustrated and described as a manual pump comprising a pump button that may be depressed and released to generate a vacuum, other types of pumps are within the scope of the present invention. For example, the pump may be a manual pump that comprises a flexible bulb, rotating handle, or any other means of manually generating a vacuum using the pump. Alternatively, the pump may be a mechanical or motorized pump which is driven by an electrical supply, such as a battery, rechargeable battery, or solar powered battery. Thus, any means known in the art for generating a vacuum that may increase the suction force of the one or more suction cups onto the hull of the watercraft is within the scope of the present invention.

Figure 7:
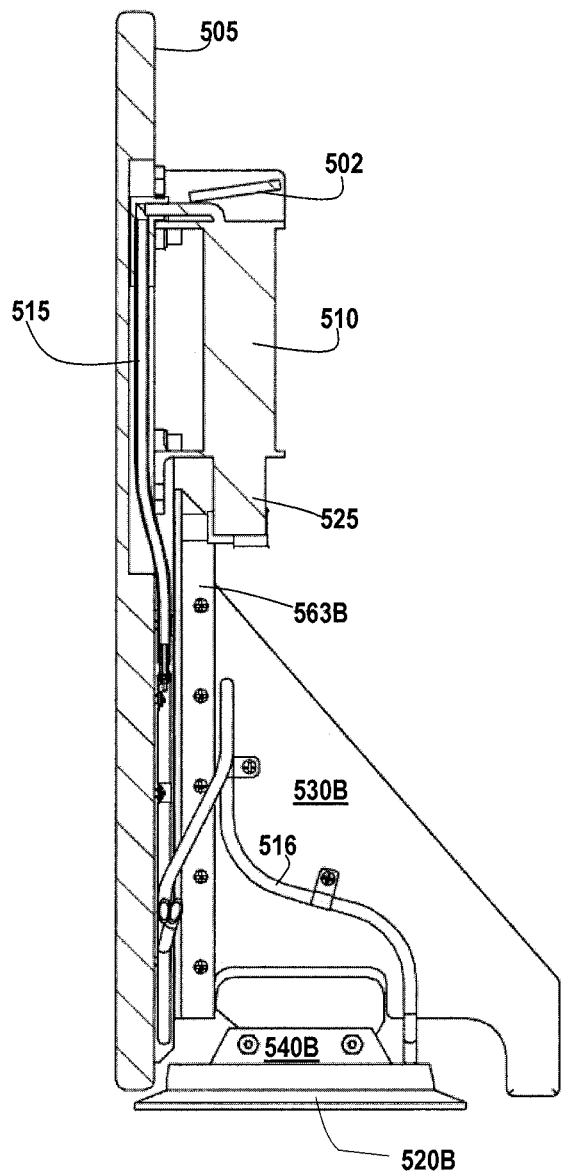
FIG. 7 is a cross-sectional view taken along line A-A of the surf wake device shown in FIG. 6.

FIG. 7 illustrates a cross-sectional view taken along line A-A of FIG. 6. Shown are the main body portion 505, side wall portion 530B, attachment handle 510 comprising the pump, pump button 525, and the suction cup 520B. Also shown are pump lines 515 and 516, mounting bracket 563B, and attachment bracket 540B. This cross-sectional view illustrates the pump line 515 exiting a top of the pump chamber (in attachment handle 510) and passing through a channel in the main body portion 505 behind the attachment handle 510.

Figure 8:
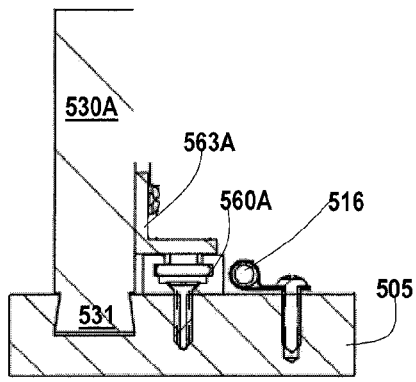
FIG. 8 is a cross-sectional view taken along line B-B of the surf wake device shown in FIG. 6, pointing out attachment means for the side panels to the main panel.

FIG. 8 illustrates a cross-sectional view taken along line B-B of FIG. 6. Shown is an exemplary means for attachment of the side wall portion 530A to the main body portion 505. For example, the side wall portion 530A and main body portion 505 may include a dovetail 531 or tongue and groove attachment means, and may further include an attachment rail 560A attachable to the main body portion which provides a moveable track for a mounting bracket 563A which is attachable to the side wall portion 530A. As such, the side wall portion 530A may be moveably attached to the main body portion 505, thus allowing the absolute position of the side wall portion 530A and associated suction cup 520A to be adjusted relative to the main body portion 505. Also shown is an exemplary attachment means for securing the pump line 516 to the device, in this case pump line 516 is secured to the main body portion 505 using a cable clip.

While certain specific connection means are illustrated in the various embodiments of the surf wake device of the presently disclosed invention, any means known in the art may be used to provide connection between the various components.

Figure 9:
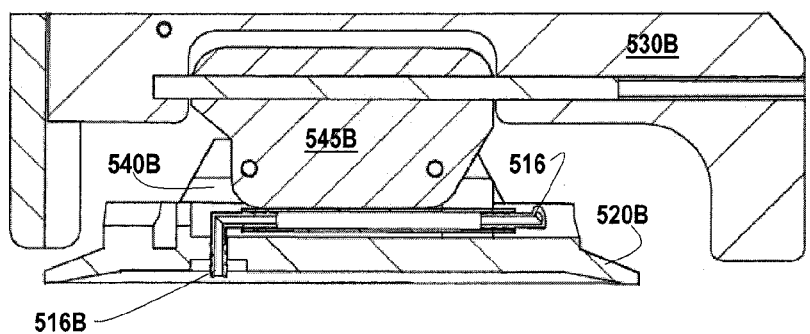
FIG. 9 is a cross-sectional view taken along line C-C of the surf wake device shown in FIG. 6.

FIG. 9 illustrates a cross-sectional view taken along line C-C of FIG. 6. Shown is one side wall portion 530B and the associated suction cup 520B. Also shown is the pump line 516 entering the right side of the suction cup 520B, and a position at which the pump line exits 516B the suction cup. When the surf wake device 500 is attached to a watercraft, a vacuum may be communicated from the pump (510) through the pump lines (as shown, pump line 516) to the suction cups (as shown, suction cup 520B). This vacuum may provide a suction force onto the watercraft which is sufficient to allow the surf wake device to remain attached to the watercraft even when a large force is applied to the main body portion 505, such as the force of the moving water when the watercraft is traveling at high speed through the water.

Also shown in FIG. 9 is the attachment bracket 540B and a repositioning segment 545B which may allow the suction cup 520B to be angled relative to the side wall portion 530B. Further, the repositioning segment(s) 545B for each suction cup may allow suction cup(s) 520B to be moved away from or closer to the main body portion 505, thus enabling attachment of the surf wake device 500 to watercraft having varying shaped hulls.

Figure 10:
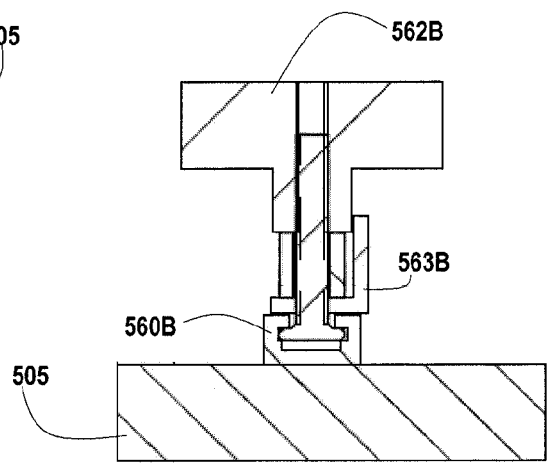
FIG. 10 is a cross-sectional view taken along line D-D of the surf wake device shown in FIG. 6.

FIG. 10 illustrates a cross-sectional view taken along line D-D of FIG. 6. Shown is the main body portion 505, the attachment rail 560B and associated mounting bracket 563B, and a locking nut 562B. The locking nut 562B may be released to allow movement of the mounting bracket 563B within the attachment rail 560B, and may be tightened to stop such movement and secure the mounting bracket 563B in position within the attachment rail 560B.

Figure 11:
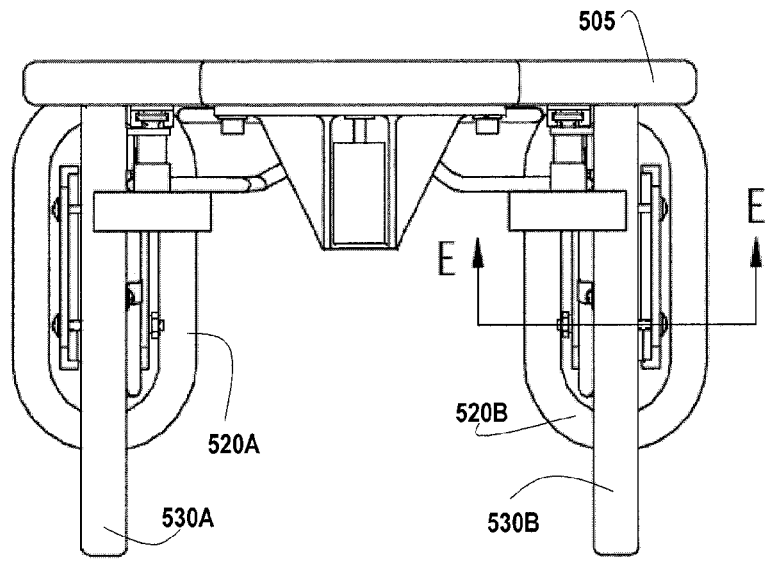
FIG. 11 is a top view of the surf wake device of FIG. 5, pointing out the side support panels, pump, and suction cups.
Figure 12:
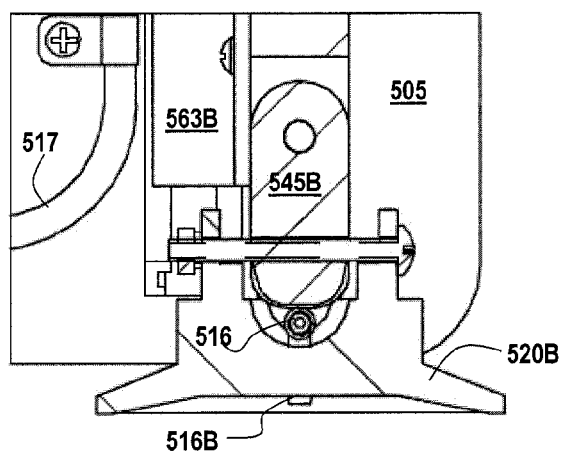
FIG. 12 is a cross-sectional view taken along line E-E of the surf wake device shown in FIG. 11.

FIG. 11 illustrates a top view of the surf wake device 500. The two side wall portions (530A, 530B), suction cups (520A, 520B), and main body portion 505 are shown. FIG. 12 illustrates a cross-sectional view taken along line E-E of FIG. 11. A cross-section of one suction cup 520B is shown with the main body portion 505 in the background. Also shown is the mounting bracket 563B, the repositioning segment 545B, and pump line 516 and its exit point 516B and pump line 517.

Figure 13:
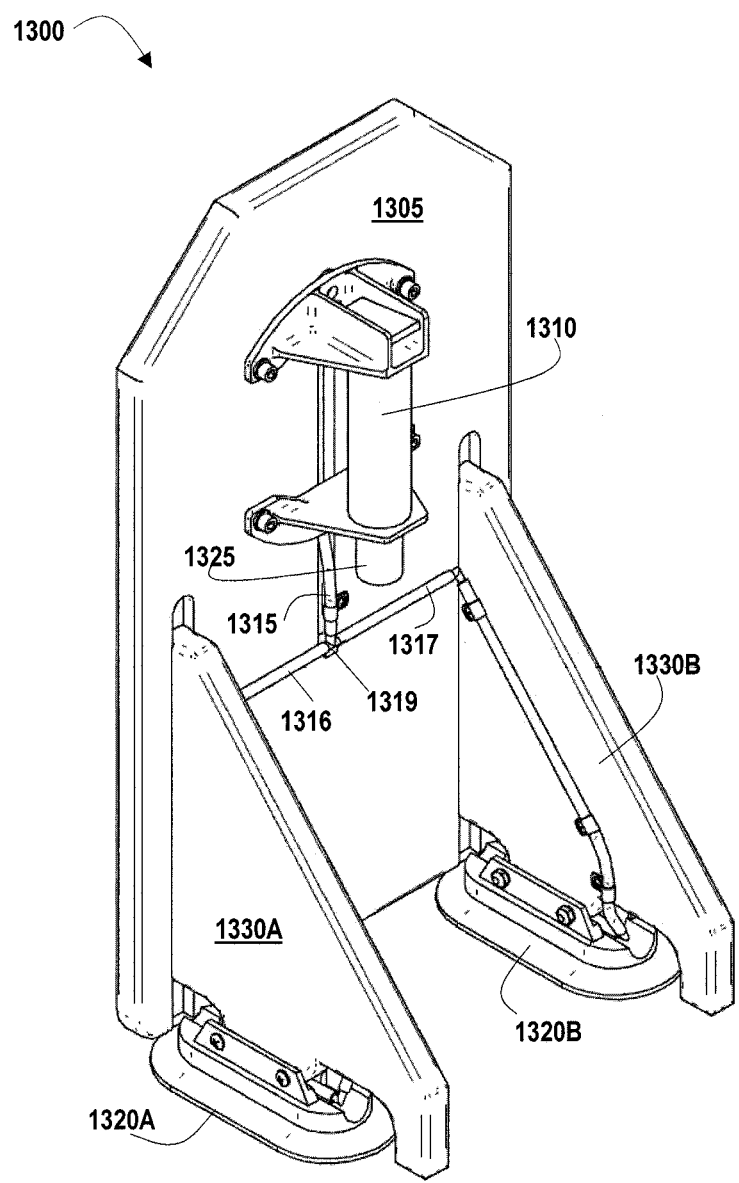
FIG. 13 is a perspective view of a surf wake device according to an embodiment of the presently disclosed invention.

As shown in FIG. 13, a surf wake device 1300 according to the presently disclosed invention may comprise a main body portion 1305, two side wall portions (1330A, 1330B), two suction cups (1320A, 1320B), an attachment handle 1310 which includes a pump, and pump lines (1315, 1316, 1317). As discussed with reference to the embodiment shown in FIGS. 5-12, the pump may include a pump button 1325 which may be depressed and released to generate a vacuum in a pump chamber (not shown). This vacuum may be communicated from the pump chamber through pump line 1315, and diverted using a T-valve 1319 to the pump lines leading to each suction cup; pump line 1316 leading to suction cup 1320A and pump line 1317 leading to suction cup 1320B.

Figure 14:
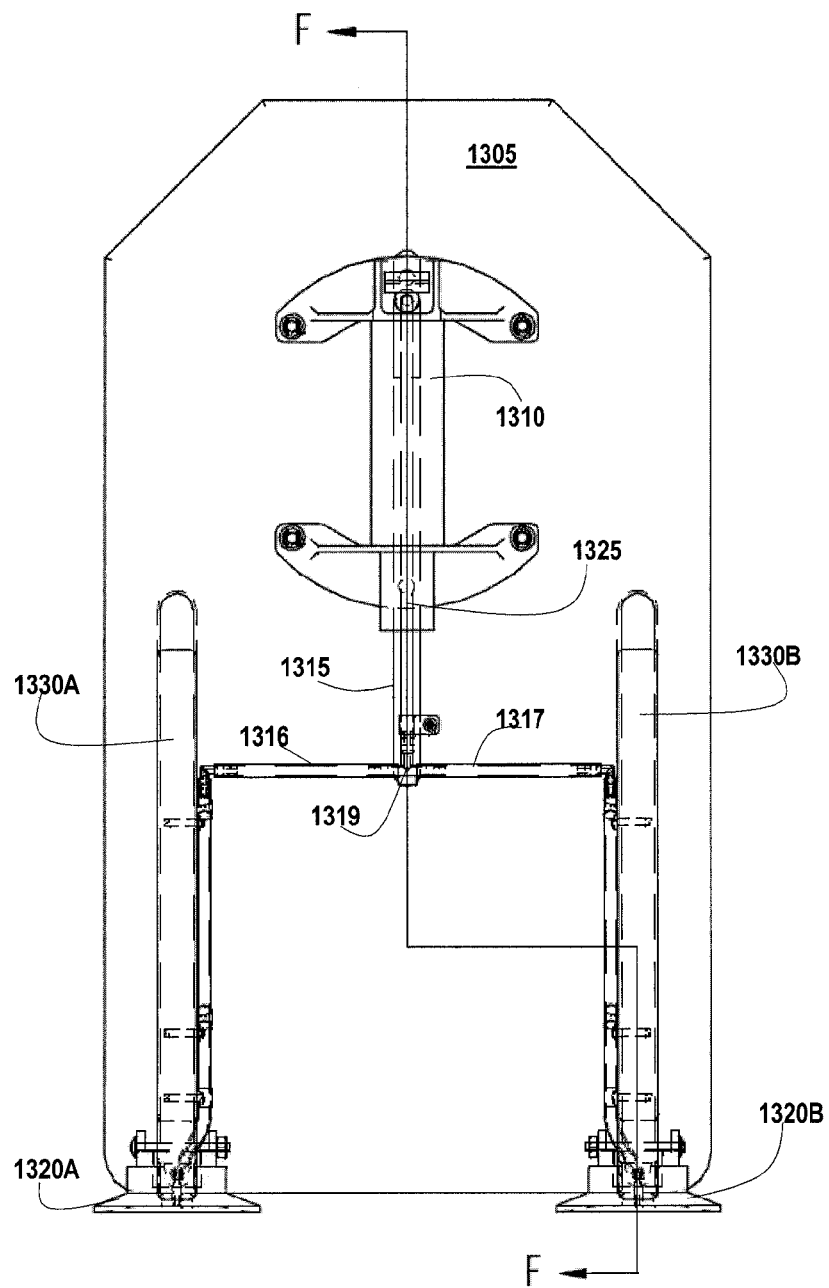
FIG. 14 is a front view of the surf wake device shown in FIG. 13, pointing out the suction cups, pump and pump lines.
Figure 15:
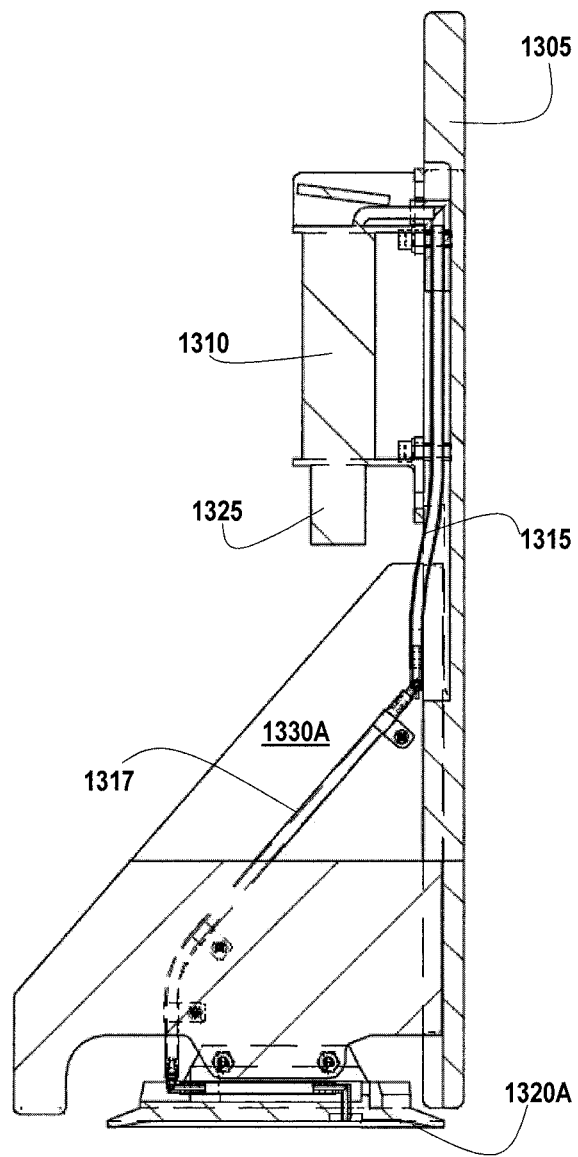
FIG. 15 is a cross-sectional view taken along line F-F of the surf wake device shown in FIG. 14.

The embodiment illustrated in FIGS. 13-15 closely resembles the embodiment represented in FIGS. 5-12, except that the side wall portions are securely attached to the main body portion, and the suction cups are securely attached to the side wall portions. As such, little to no adjustment of the position of the suction cups relative to the main body portion is possible. Such an embodiment may be less expensive to manufacture, and may be more durable in use as there are fewer parts.

FIG. 14 illustrates a top view of the surf wake device shown in FIG. 13. Shown for reference are the main body portion 1305, attachment handle 1310, two side wall portions (1330A, 1330B), and the two suction cups (1320A, 1320B). Also shown are the pump button 1325, pump lines (1315, 1316, 1317), and a T-valve 1319 which provide fluid communication for the vacuum generated by the pump to the suction cups (1320A, 1320B).

FIG. 15 illustrates a cross-sectional view taken along line F-F of FIG. 14. Shown is an exemplary means for attachment of the side wall 1330A to the main body portion 1305. For example, the side wall portion 1330A and main body portion 1305 may be directly attached using a dovetail or tongue and groove attachment means, or any other attachment means known in the art. Also shown is the attachment handle 1310 comprising the vacuum pump, and pump line 1315 exiting a top of the vacuum pump and travelling through a path in the main body portion which lies behind the attachment handle 1310. The pump line 1317 is secured to the side wall portion 1330A, and is shown to travel through a path formed within a lower region of the side wall portion 1330A to enter the suction cup 1320A.

Figure 16:
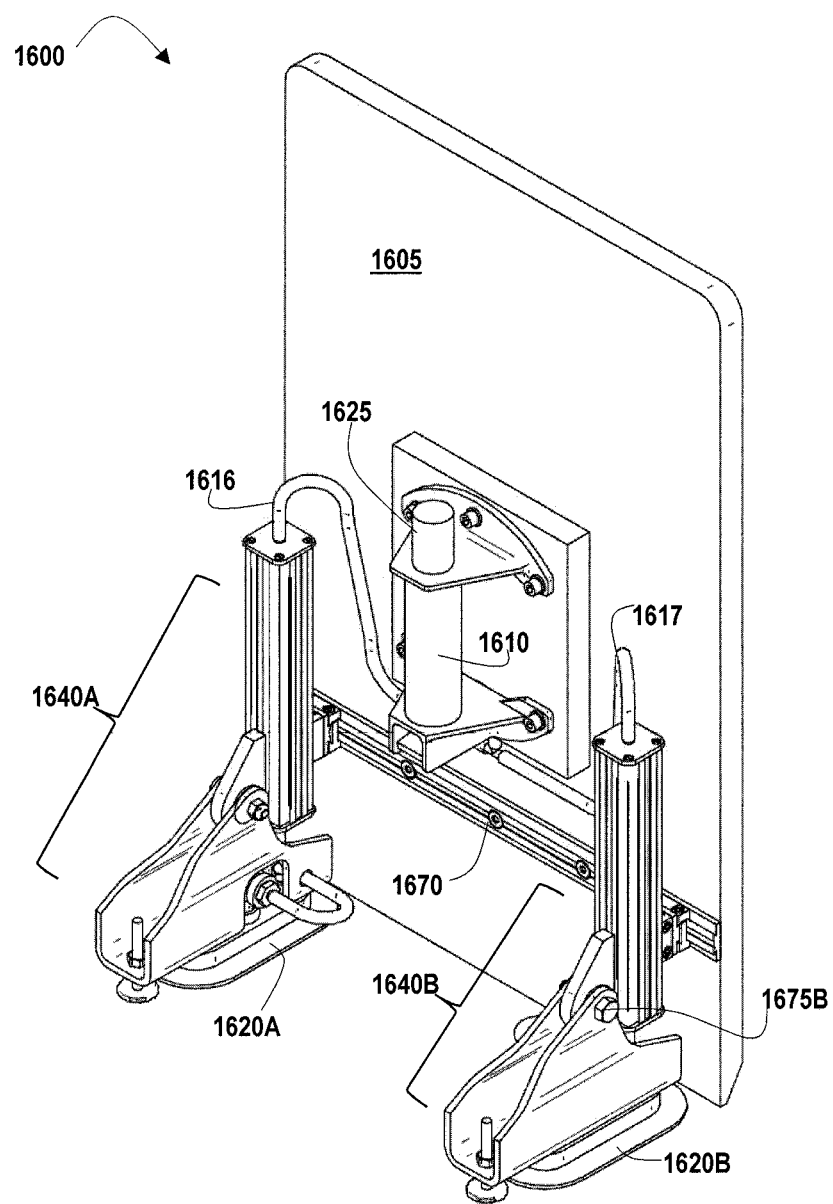
FIG. 16 is a perspective view of a surf wake device according to an embodiment of the presently disclosed invention.

FIG. 16 illustrates a surf wake device 1600 according to the presently disclosed invention. The surf wake device 1600 may comprise a main body portion 1605, two suction cups (1620A, 1620B), an attachment handle 1610 which includes a pump, and pump lines (1616, 1617). As discussed with reference to the embodiment shown in FIGS. 5-12, the pump may include a pump button 1625 which may be depressed and released to generate a vacuum in a pump chamber (not shown). This vacuum may be communicated from the pump chamber through pump lines to each suction cup; pump line 1616 leading to suction cup 1620A and pump line 1617 leading to suction cup 1620B.

FIG. 16 also illustrates an attachment rail 1670 which provides connection between the suction cups (1620A, 1620B) and the main body portion 1605 via respective mounting brackets (1640A, 1640B). The absolute angle of attachment of the suction cups (1620A, 1620B) relative to the main body portion 1605 may be altered using respective attachment bolts (only one is labelled, 1675B). Further, the absolute position of each suction cup (1620A, 1620B) relative to the main body portion 1605 may be altered by adjusting the horizontal position of the mounting bracket(s) (1640A, 1640B) on the attachment rail 1670 (direction is given with reference to the orientation shown in FIG. 16).

Figure 17:
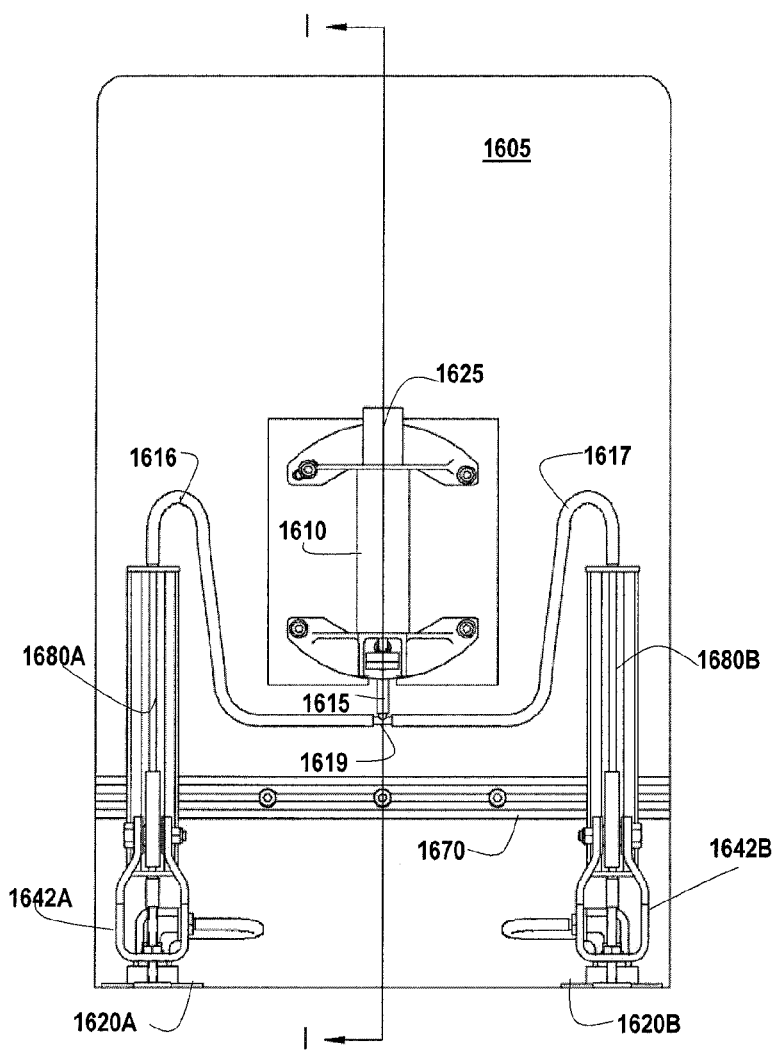
FIG. 17 is a front view of the surf wake device shown in FIG. 16, pointing out the pump, pump lines, mounting brackets and attachment rail.

FIG. 17 shows a front view of the surf wake device shown in FIG. 16. Shown for reference are the main body portion 1605, attachment handle 1610, and the two suction cups (1620A, 1620B). Also shown are the pump button 1625, pump lines (1615, 1616, 1617), and a T-valve 1619 which provide fluid communication for the vacuum generated by the pump to the suction cups (1620A, 1620B). The two mounting brackets (1640A, 1640B) comprise respectively a set of attachment brackets (1642A, 1642B) and a set of attachment rods (1680A, 1680B). The pump lines (1616, 1617) may travel through the attachment rods (1680A, 1680B) to respective suction cups (1620A, 1620B).

Figures 18, 19:
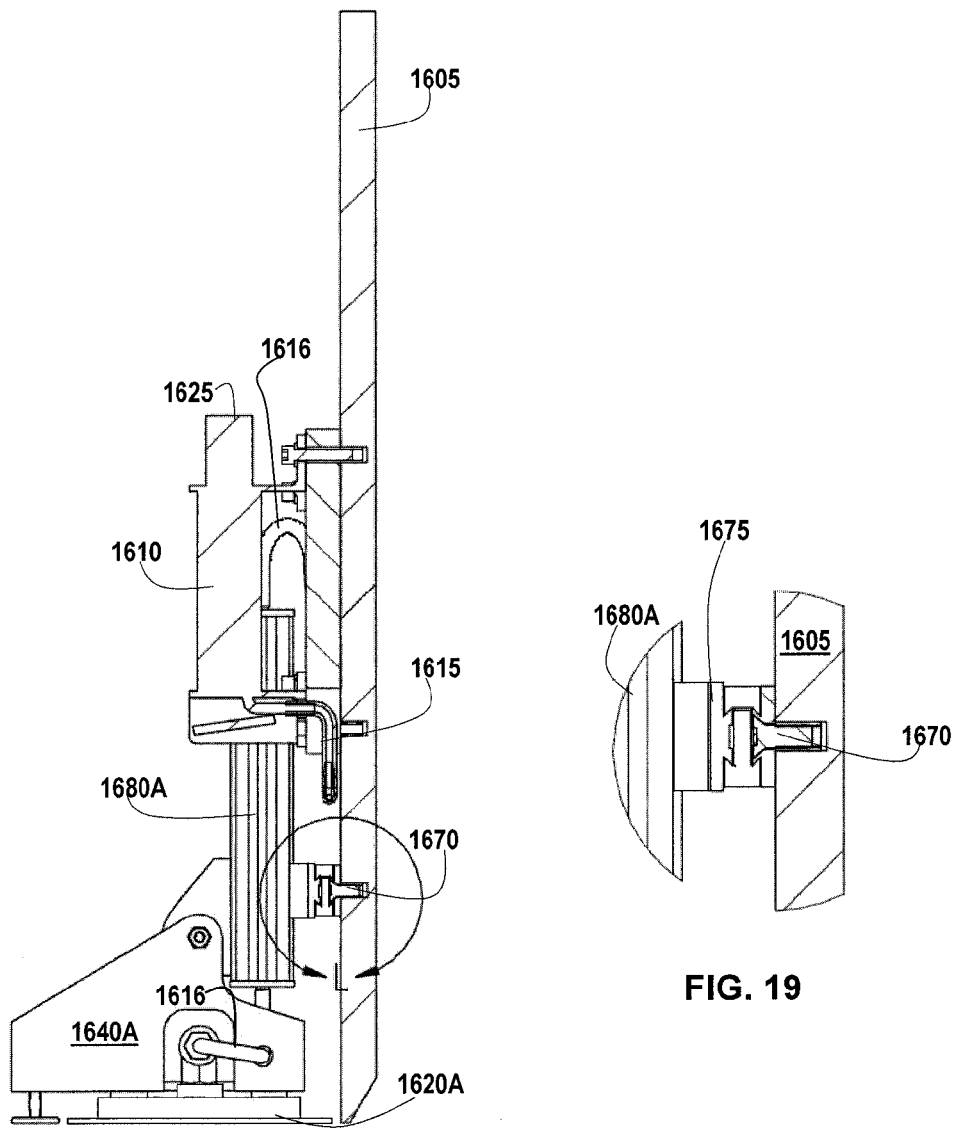
FIG. 18 is a cross-sectional view taken along line I-I of the surf wake device shown in FIG. 17.
FIG. 19 is a close-up view of detail L from FIG. 18 showing connection means between the mounting bracket, the attachment rail and the main body portion.

FIG. 18 illustrates a cross-sectional view taken along line I-I of FIG. 17. Shown is an exemplary means for attachment of the attachment rods 1680A to the main body portion 1605. Also shown is the attachment handle 1610 comprising the vacuum pump and pump button 1625, and pump line 1615 exiting a bottom of the vacuum pump (residing within the attachment handle 1610). The pump line 1616 is shown to enter the mounting bracket 1640A, thus traveling along a path within mounting bracket 1640A before exiting at an end thereof, and entering the suction cup 1620A.

A connection means for the attachment rail 1670 to the main body portion 1605 is illustrated in detail L, shown in FIG. 19. The attachment rod 1680A may comprise a connection means 1675 which provides connection to the attachment rail 1670.

Figure 20:
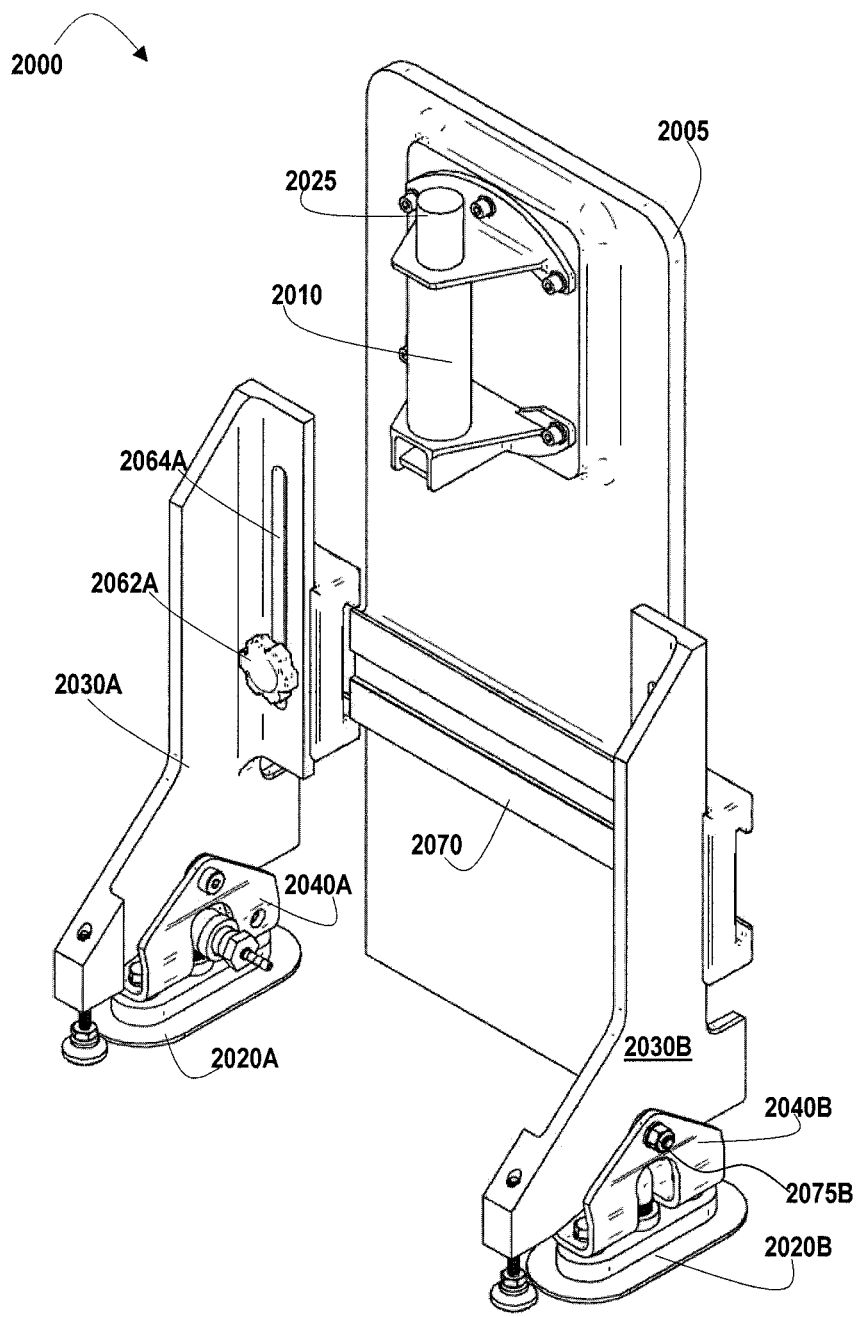
FIG. 20 is a perspective view of a surf wake device according to an embodiment of the presently disclosed invention.

FIG. 20 illustrates a surf wake device 2000 according to the presently disclosed invention. The surf wake device 2000 may comprise a main body portion 2005, two suction cups (2020A, 2020B), and an attachment handle 2010. While not specifically shown in FIG. 20, the attachment handle 2010 may comprise a vacuum pump. Further, and as discussed above, the pump may include a pump button which may be depressed and released to generate a vacuum in a pump chamber (not shown), and pump lines to communicate the vacuum from the pump chamber to each suction cup.

FIG. 20 also illustrates an attachment rail 2070 which provides connection between the suction cups (2020A, 2020B) and the main body portion 2005 via respective side panel portions (2030A, 2030B). The absolute angle of attachment of the suction cups (2020A, 2020B) relative to the main body portion 2005 may be altered using respective attachment brackets (2040A, 2040B) and attachment bolts (only one is labelled, 2075B). Further, the absolute position of each suction cup (2020A, 2020B) relative to the main body portion 2005 may be altered by adjusting the horizontal and/or vertical position of the side panel portion(s) (2030A, 2030B) on the attachment rail 2070. That is, respective locking nuts (only one shown, 2062A) may be used to secure the side panel portions (2030A, 2030B) after horizontal movement along attachment rail 2070, or vertical movement along slots (only one shown, 2064A) within the side panel portions (2030A, 2030B).

Figure 21:
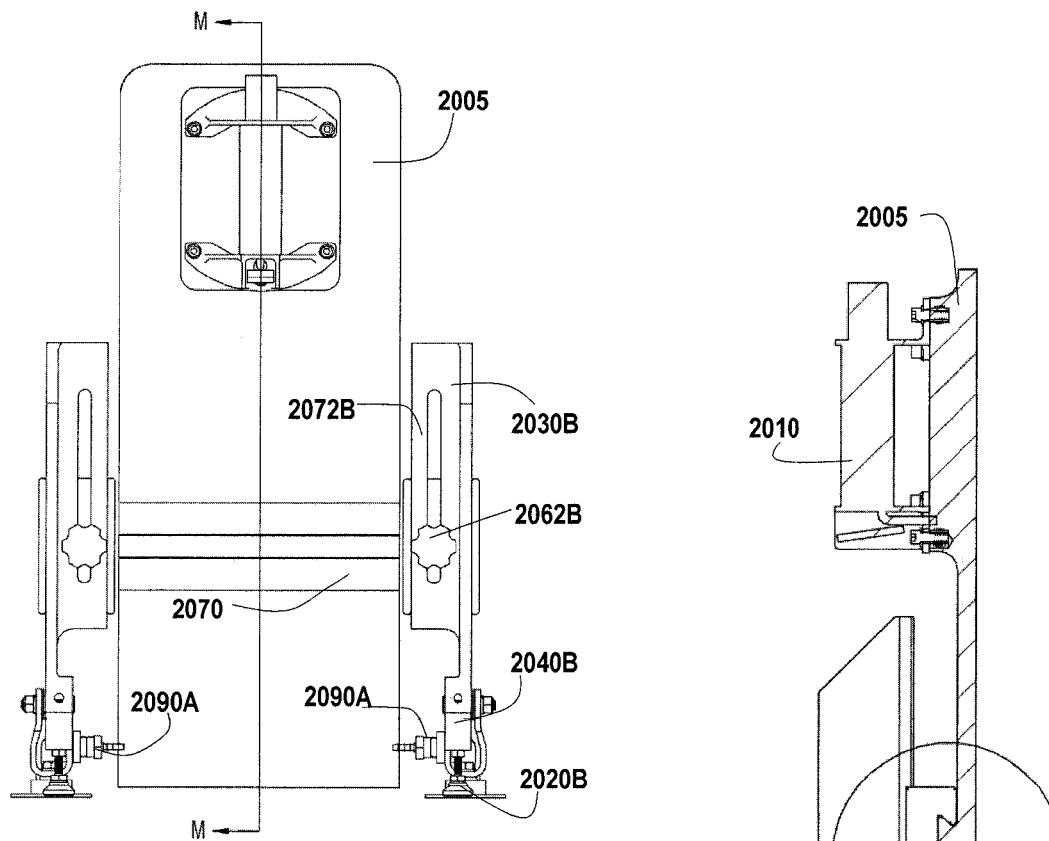
FIG. 21 is a front view of the surf wake device shown in FIG. 20, pointing out the adjustable brackets that allow vertical and horizontal movement of the suction cups.

FIG. 21 shows a front view of the surf wake device shown in FIG. 20. Labelled for reference are the main body portion 2005, attachment rail 2070, one suction cup 2020B, one attachment bracket 2040B, one side panel portion 2030B, and one locking nut 2062B. Also shown are pump line attachment ports (2090A, 2090B) at the sides of the suction cups. While no pump or pump lines are shown, such could be included in this embodiment.

Figure 22:
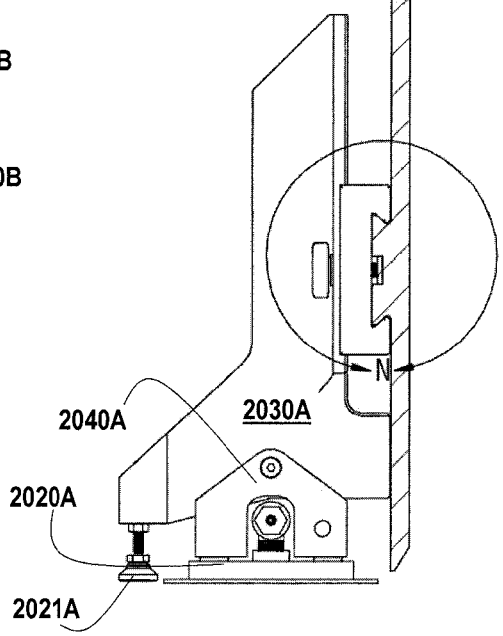
FIG. 22 is a cross-sectional view taken along line M-M of the surf wake device shown in FIG. 21.

FIG. 22 illustrates a cross-sectional view taken along line M-M of FIG. 21. Shown is an exemplary means for attachment of the side panel portion 2030A to the main body portion 2005 (detail N) via the attachment rail. Also shown is the attachment handle 2010, the attachment bracket 2040A, the suction cup 2020A, and a stabilizing foot 2021A which may provide additional support for the device 2000 when attached to the hull of a watercraft, such as along the transom adjacent a port side or a starboard side.

Figure 23:
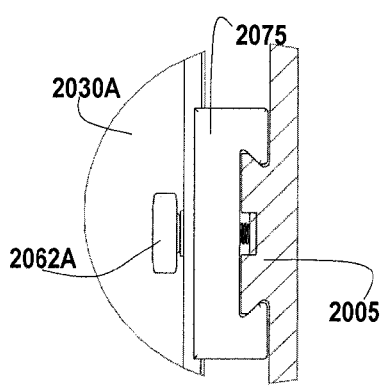
FIG. 23 is a close-up view of detail N from FIG. 22 showing connection means between the attachment bracket and the main body portion.

An exemplary attachment rail 2070 is illustrated in detail N, and shown in FIG. 23. The main body portion 2005 may be formed with an attachment bracket formed or attached thereon. A connecting plate 2075 may be directly attached to the bracket formed on the main body portion. As such, the side panel portion 2030A may be securely attached to the main body portion 2005 using the connecting plate 2075 and a locking nut 2062A.

Figure 24:
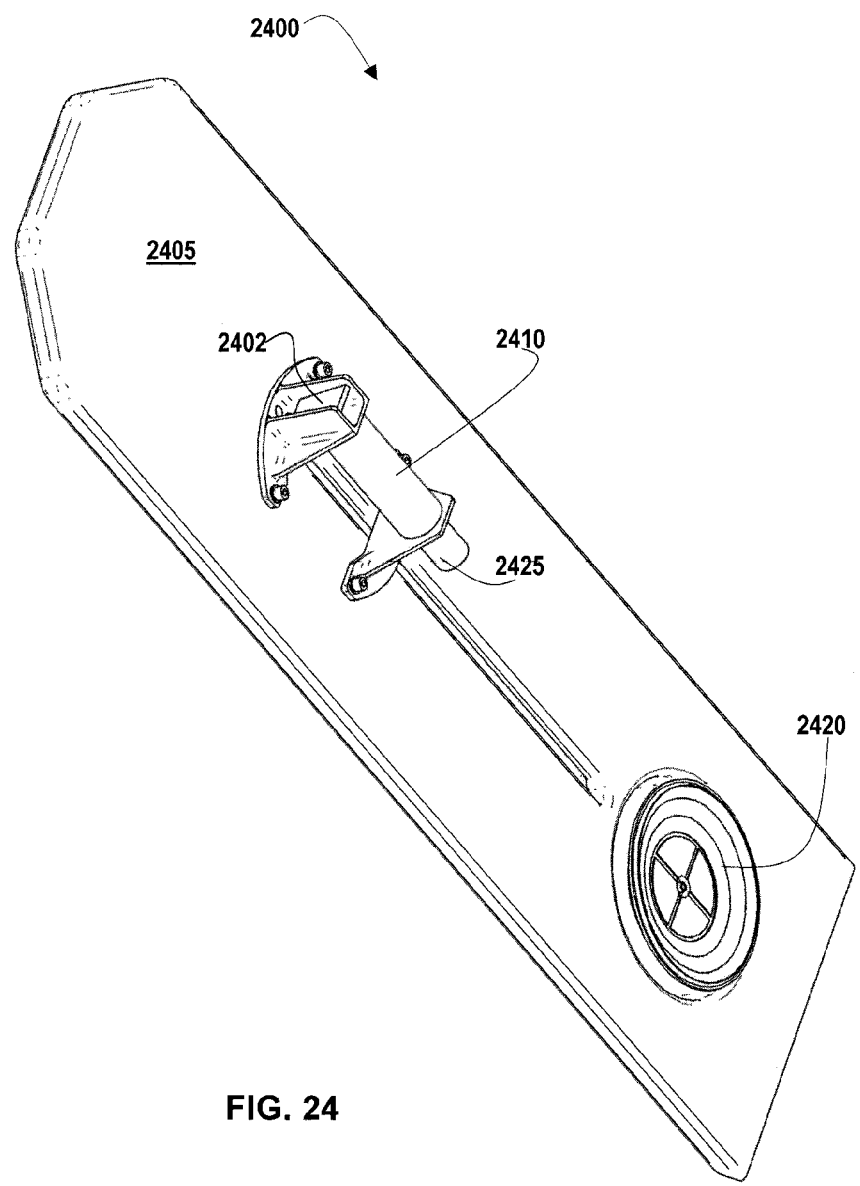
FIG. 24 is a perspective view of a surf wake device of the presently disclosed invention.
Figure 25:
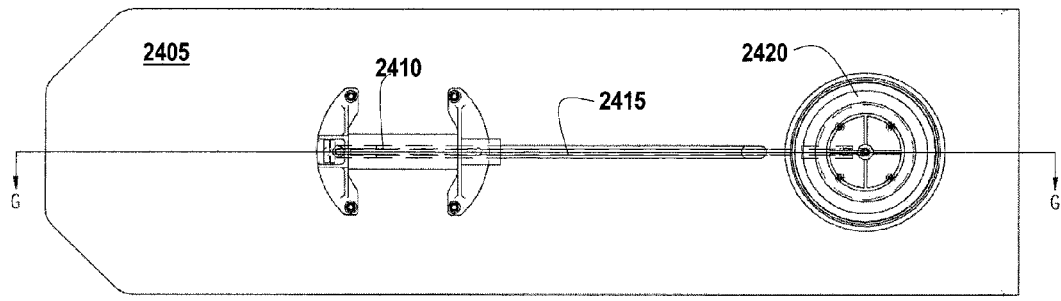
FIG. 25 is a front view of the surf wake device shown in FIG. 24, pointing out the pump, pump lines and suction cup.

Shown in FIG. 24 is a surf wake device 2400 according to the presently disclosed invention. As indicated above, the surf wake device 2400 may be attached to the hull of a watercraft along the port or starboard sides of the watercraft (refer to FIG. 2A). The surf wake device 2400 may comprise a main body portion 2405, a suction cup 2420, an attachment handle 2410 comprising a vacuum pump, a pump button 2425, and a release actuator 2402. As shown in FIG. 24, the suction cup may be substantially coplanar with the main body portion, or substantially parallel with a longitudinal axis of the main body portion 2405. As shown in FIG. 25, the surf wake device 2400 may further comprise at least one pump line 2415 which provides fluid communication between the pump and the suction cup 2420.

Figure 26:
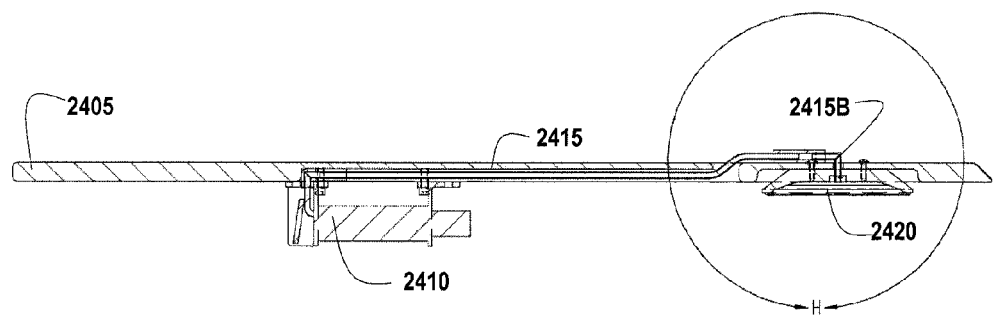
FIG. 26 is a cross-sectional view taken along line G-G of the surf wake device shown in FIG. 25, pointing out the pump lines connecting the pump and suction cup.
Figure 27:
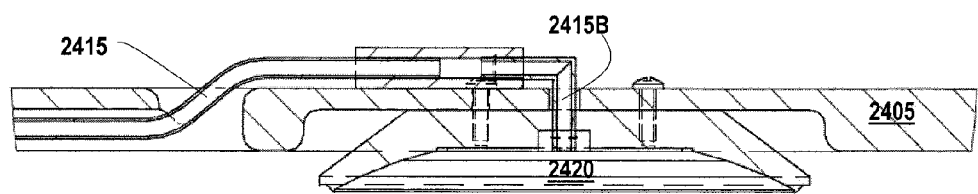
FIG. 27 is a close-up view of detail H from FIG. 26, showing attachment of the suction cup to the main body panel and the path of the pump line.

Shown in FIG. 26 is a cross-sectional view taken along line G-G of the surf wake device 2400 of FIG. 25. The main body portion 2405, attachment handle 2410, and suction cup 2420 are labelled for reference. Also shown is the path of pump line 2415 and the position 2415B at which the pump line 2415 enters the suction cup 2420. FIG. 27 shows an enlarged view of detail H from FIG. 26, which provides a better view of the path of pump line 2415 and the position 2415B at which the pump line 2415 enters the suction cup 2420.

As indicated, the embodiment shown in FIGS. 24-27 may be removeably attachable to the hull of the watercraft along the port side or starboard side. In all embodiments, the device is designed to extend past the hull of the watercraft into the passing water.

While specific embodiments of the invention have been described in detail, it should be appreciated by those skilled in the art that various modifications and alternations and applications could be developed in light of the overall teachings of the disclosure. For example, while several different means have been described herein for connection of the various components of the presently disclosed invention, any connection means known in the art is/are within the scope of the presently disclosed invention. Accordingly, the particular arrangements, systems, apparatuses, and methods disclosed are meant to be illustrative only and not limiting as to the scope of the invention.

What is claimed is:

1. A device to redirect a wake of a watercraft, the device comprising:
a main body portion having a back side which faces away from a flow of water when the device is attached to a hull of the watercraft;
at least two side panels attached to the backside of the main body portion parallel to a longitudinal axis of and substantially perpendicular to the main body portion;
at least one suction cup attached to the at least two side panels so that a radial axis of the at least one suction cup is substantially perpendicular to the main body portion;
a handle attached to the back side of the main body portion at a position distal from the at least one suction cup;
at least one vacuum pump integral with the handle and in fluid communication with the at least one suction cup, wherein the at least one vacuum pump provides a vacuum between the at least one suction cup and the hull of the watercraft when the device is attached to the hull of the watercraft;
at least one pump line connected to the at least one vacuum pump and the at least one suction cup, and providing the fluid communication between the at least one vacuum pump and the at least one suction cup; and
at least one release actuator for selectively releasing the vacuum between the at least one suction cup and the hull of the watercraft,
wherein removable attachment of the device to a transom adjacent a port side of the watercraft changes a shape of the wake on a starboard side of the watercraft, and removable attachment of the device to the transom adjacent the starboard side of the watercraft changes the shape of the wake on the port side of the watercraft.

2. The device of claim 1, wherein the device is removeably attached along the transom on only one side of the watercraft such that the device is positioned outboard extending beyond the hull of the watercraft and into the flow of water as the watercraft travels through water.

3. The device of claim 1, further comprising:
a safety cable providing removable connection between the device and the hull of the watercraft.

4. The device of claim 1, wherein the main body portion comprises a water resistant plastic material.

5. The device of claim 1, wherein the device is designed to float.

6. The device of claim 1, further comprising:
at least one attachment rail that provides movement of the at least two side panels to at least one different longitudinal position on the main body portion.

7. The device of claim 1, further comprising:
a second attachment rail for positioning or angling each of the at least two side panels relative to the main body portion.

8. The device of claim 1,
wherein the at least one suction cup is attached to the at least two side panels by a positioning bracket so that a position, angle, or combination thereof of the at least one suction cup is adjustable relative to the at least two side panels.

9. A device to redirect a wake of a watercraft, the device comprising:

a main body portion having a back side which faces away from a flow of water when the device is attached to the watercraft;

at least two side panels attached to the back side of the main body portion parallel to a longitudinal axis of, and positioned substantially perpendicular to the main body portion;

at least two suction cups which provide removable attachment of the device to a hull of the watercraft, wherein each of the at least two suction cups are attached to one of the at least two side panels so that the at least two suction cups are positioned substantially perpendicular to the main body portion;

a handle attached to the back side of the main body portion at a position distal from the at least two suction cups;

at least one vacuum pump integral with the handle and in fluid communication with the at least two suction cups, wherein the at least one vacuum pump provides a vacuum between the at least two suction cups and the hull of the watercraft when the device is attached to the hull of the watercraft;

at least two pump lines connected to the at least one vacuum pump and the at least two suction cups, and providing the fluid communication between the at least one vacuum pump and the at least two suction cups; and at least one release actuator for selectively releasing the vacuum between the at least two suction cups and the hull of the watercraft, wherein the device is removeably attached to the hull of the watercraft along a transom adjacent to either a port side or a starboard side such that the device is positioned outboard extending beyond the hull and into the flow of water as the watercraft travels through water, wherein removable attachment of the device to the transom on the port side of the watercraft changes a shape of the wake on the starboard side of the watercraft, and removable attachment of the device to the transom on the starboard side of the watercraft changes the shape of the wake on the port side of the watercraft.

10. The device of claim 9, wherein the at least two side panels are each attached to the main body portion by at least one attachment rail that provides movement of each of the at least two side panels to at least one different position on the main body portion.

11. The device of claim 9, further comprising:
at least one positioning bracket, wherein the positioning bracket provides for angling or changing a position of one or both of the at least two suction cups relative to the main body portion.

12. The device of claim 9, further comprising:
a safety cable providing removable connection between the device and the hull of the watercraft.

13. The device of claim 9, wherein each of the at least two suction cups are attached to each of the at least two side panels by one of at least two second positioning brackets, wherein each second positioning bracket provides for angling one of the at least two suction cups relative to the main body portion.

14. The device of claim 9, wherein the at least two suction cups are each attached to the at least two side panels by a second positioning bracket so that a position, angle, or combination thereof of each of the at least two suction cups is adjustable relative to the at least two side panels.

15. The device of claim 9, wherein the main body portion comprises a water resistant plastic material.

16. The device of claim 9, wherein the device is designed to float.

17. A device to redirect a wake of a watercraft, the device comprising:

a main body portion having a back side which faces away from a flow of water when the device is attached to the watercraft;

at least one suction cup connected to the back side of the main body portion, the at least one suction cup providing removable attachment of the device to a hull of the watercraft, wherein the at least one suction cup has a radial axis that is substantially parallel to a longitudinal axis of the main body portion;

at least one handle attached to the back side of the main body portion at a position distal from the at least one suction cup;

at least one vacuum pump integral with the handle and in fluid communication with the at least one suction cup, wherein the at least one vacuum pump provides a vacuum between the at least one suction cup and the hull of the watercraft when the device is attached to the hull of the watercraft;

at least one pump line connected to the at least one vacuum pump and the at least one suction cup, and providing the fluid communication between the at least one vacuum pump and the at least one suction cup; and at least one release actuator for selectively releasing the vacuum between the at least one suction cup and the hull of the watercraft;

wherein the device is removeably attached to the hull of the watercraft on either a port side or a starboard side adjacent a transom, such that the device is positioned outboard extending beyond the transom and into a flow of water as the watercraft travels through water, and wherein removable attachment of the device to the port side of the watercraft along the hull changes a shape of the wake on the starboard side of the watercraft, and removable attachment of the device to the starboard side of the watercraft along the hull changes the shape of the wake on the port side of the watercraft.

18. The device of claim 17, further comprising:
a safety cable providing removable connection between the device and the hull of the watercraft.

19. The device of claim 17, wherein the main body portion comprises a water resistant plastic material.

20. The device of claim 17, wherein the device is designed to float.

* * * * *